(12) United States Patent
Li (10) Patent No.: US 11,814,453 B2
(45) Date of Patent: Nov. 14, 2023

(54) MULTIPLE-STAGE HEATING FOR A FLASHLINE HEATER

(71) Applicant: Chevron Phillips Chemical Company LP, The Woodlands, TX (US)

(72) Inventor: Hetian Li, Houston, TX (US)

( * ) Notice: Subject to any disclaimer, the term of this patent is extended or adjusted under 35 U.S.C. 154(b) by 145 days.

(21) Appl. No.: 17/306,382

(22) Filed: May 3, 2021

(65) Prior Publication Data

US 2022/0348693 A1 Nov. 3, 2022

(51) Int. Cl.
  *C08F 2/01* (2006.01)
  *B01D 1/00* (2006.01)
  *B01D 1/14* (2006.01)
  *C08F 6/00* (2006.01)

(52) U.S. Cl.
  CPC .............. *C08F 2/01* (2013.01); *B01D 1/0082* (2013.01); *B01D 1/14* (2013.01)

(58) Field of Classification Search
  None
  See application file for complete search history.

(56) References Cited

U.S. PATENT DOCUMENTS

| | | | |
|---|---|---|---|
| 3,285,899 A | 11/1966 | Houser | |
| 3,428,619 A | 2/1969 | Hawkins | |
| 4,126,743 A * | 11/1978 | Shiomura | C08F 6/24 528/496 |
| 8,597,582 B2 | 12/2013 | Hottovy | |
| 8,883,940 B2 | 11/2014 | Kufeld | |
| 9,120,886 B2 | 9/2015 | Hottovy | |
| 10,556,971 B2 | 2/2020 | Lawson | |
| 2009/0312513 A1 | 12/2009 | Marissal | |
| 2011/0098421 A1 | 4/2011 | Van Looveren | |
| 2014/0329977 A1 | 11/2014 | Hottovy | |
| 2015/0011718 A1 | 1/2015 | Kufeld | |

OTHER PUBLICATIONS

International Search Report and Written Opinion issued in corresponding application No. PCT/US2022/071888, dated Jul. 26, 2022, 12 pp.

* cited by examiner

*Primary Examiner* — Fred M Teskin
(74) *Attorney, Agent, or Firm* — Conley Rose, P.C.

(57) ABSTRACT

Disclosed are a process for operating a flashline heater and a flashline separation system. In the process and system, heat is supplied to the flashline heater by a first steam stage followed by a second steam stage. The steam pressure is controlled by a steam control system such that the pressure in the first steam stage is not equal to the pressure in the second steam stage. Also disclosed is a process for retrofitting a steam control system in a flashline separation system of an olefin polymerization system at least by changing the number of steam stages in the flashline separation system to include a first steam stage followed by a second steam stage, and changing the stream pressure control scheme such that the pressure in the first steam stage is independently controlled to be not equal to the pressure in the second steam stage.

23 Claims, 3 Drawing Sheets

MULTIPLE-STAGE HEATING FOR A FLASHLINE HEATER

TECHNICAL FIELD

The present disclosure relates to the polymerization of olefins, and particularly, to the heating of the polymerization product that is discharged from a polymerization reactor.

BACKGROUND

A polyolefin can be prepared by polymerization of an olefin monomer in a polymerization reactor in which feed materials such as the olefin monomer, an olefin comonomer, catalyst, activator, chain transfer agent, and catalyst diluent are introduced. The polymerization reactions within the reactor yield the polyolefin as part of a polymerization product. The polymerization product is discharged from the reactor and then subjected to heating in order to convert liquid in the polymerization product into vapor. After heating, the polymerization product is fed to a separation vessel, where the vapor is separated from the polyolefin solids (fluff). The polyolefin solids are then recovered from the separation vessel, and hydrocarbons in the recovered vapor can be separated and recycled using a monomer/diluent recovery system.

Heating of the polymerization product can be performed in a flashline heater. The temperature of the polymerization product in the flashline heater can be controlled so that a substantial portion of the liquid in the polymerization product converts to vapor without melting the polyolefin as the polymerization product passes through the flashline heater. However, lack of proper temperature control can result in melting of the polyolefin or insufficient vaporization of liquids in the polymerization product, which can increase the cost of polyolefin recovery and decrease recovery (e.g., of unreacted olefin(s) and diluent).

SUMMARY

Disclosed herein is a process for operating a flashline heater in an olefin polymerization system, wherein the flashline heater has a first steam stage and a second steam stage. The process can include controlling a first pressure of steam in the first steam stage of the flashline heater to be equal to about a first value, and controlling a second pressure of steam in the second steam stage of the flashline heater to be equal to about a second value, wherein the first value is not equal to the second value.

Disclosed herein is a process for operating a flashline heater in an olefin polymerization systema flashline separation system that includes a flashline heater and a steam control system. The flashline heater can have a first steam stage followed by a second steam stage. The steam control system can include a first controller configured to control a first pressure of steam in the first steam stage of the flashline heater to be equal to about a first value; and a second controller configured to control a second pressure of steam in the second steam stage of the flashline heater to be equal to about a second value, wherein the first value is not equal to the second value.

Also disclosed herein is a process for retrofitting a steam control system in a flashline separation system of an olefin polymerization system. The process can include changing a number of steam stages in the flashline separation system to include a first steam stage and a second steam stage, wherein the first steam stage is followed by the second steam stage; and changing the steam control system to have i) a first controller configured to control a first pressure of steam in the first steam stage to be equal to about a first value and ii) a second controller configured to control a second pressure of steam in the second steam stage to be equal to about a second value. In the retrofitting process, the first value is not equal to the second value.

BRIEF DESCRIPTION OF THE DRAWINGS

The following figures form part of the present specification and are included to further demonstrate certain aspects of the present invention. The invention may be better understood by reference to one or more of these figures in combination with the detailed description of specific embodiments presented herein.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The figures described above and the written description of specific structures and functions below are not presented to limit the scope of what Applicant has invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location, and time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower,"

"up," "down," "side," and the like are used in the written description for clarity in specific reference to the figures and are not intended to limit the scope of the invention or the appended claims.

The terms "configured to", "configured for use", "adapted for use", and similar language is used herein to reflect that the particular recited structure or procedure is used in a disclosed system or process. For example, unless otherwise specified, a particular structure "configured for use" means it is "configured for use in an olefin polymerization system" and therefore is designed, shaped, arranged, constructed, and/or tailored to effect an olefin polymerization, as would have been understood by the skilled person.

The terms "conduit" and "line" are interchangeable, and as used herein, refer to a physical structure configured for the flow of materials therethrough, such as pipe or tubing. The materials that flow in the "conduit" or "line" can be in the gas phase, the liquid phase, the solid phase, or a combination of these phases.

The term "stream" as used herein refers to a physical composition of materials that flow through a "conduit" or "line".

Disclosed herein are a system and process that include multiple-stage heating of a polymerization product in a flashline heater. Two problems encountered with flashline heater operation are inadequate heating of the polymerization product, which results in decreased diluent recovery, and over-heating, which results in melting of the polyolefin and plugging. To prevent inadequate heating and over-heating, the flashline heater can be designed with smaller-diameter segments and/or shorter length. Smaller diameters can enable discharge of polymerization product from the polymerization reactor at a high velocity, which may be advantageous for high wall-to-slurry heat transfer and for transport of the polyolefin solids through the flashline heater. Smaller diameter flashline heaters may also decrease costs associated with polymerization system construction, as well as decrease the overall footprint of the polymerization system. Even in appropriately sized flashline heaters, the temperature of the polymerization product can be controlled so that a substantial portion of the liquid in the polymerization product converts to vapor without melting the polyolefin as the polymerization product passes through the flashline heater. It has been found that using more than one heating stage, i.e., having multiple heating stages in the system and process disclosed herein, better controls the temperature of the polyolefin inside the flashline heater and prevents melting of the polyolefin inside the flashline heater, which in turn reduces plugging caused by accumulated polyolefin in the flashline heater. While the embodiments discussed for the figures below include two stages for heating a polymerization product, it is contemplated that more than two stages can be included in the system and process within the scope of this disclosure, and that the additional heating stage(s) can be configured similarly to the two heating stages described herein.

Figure 1:
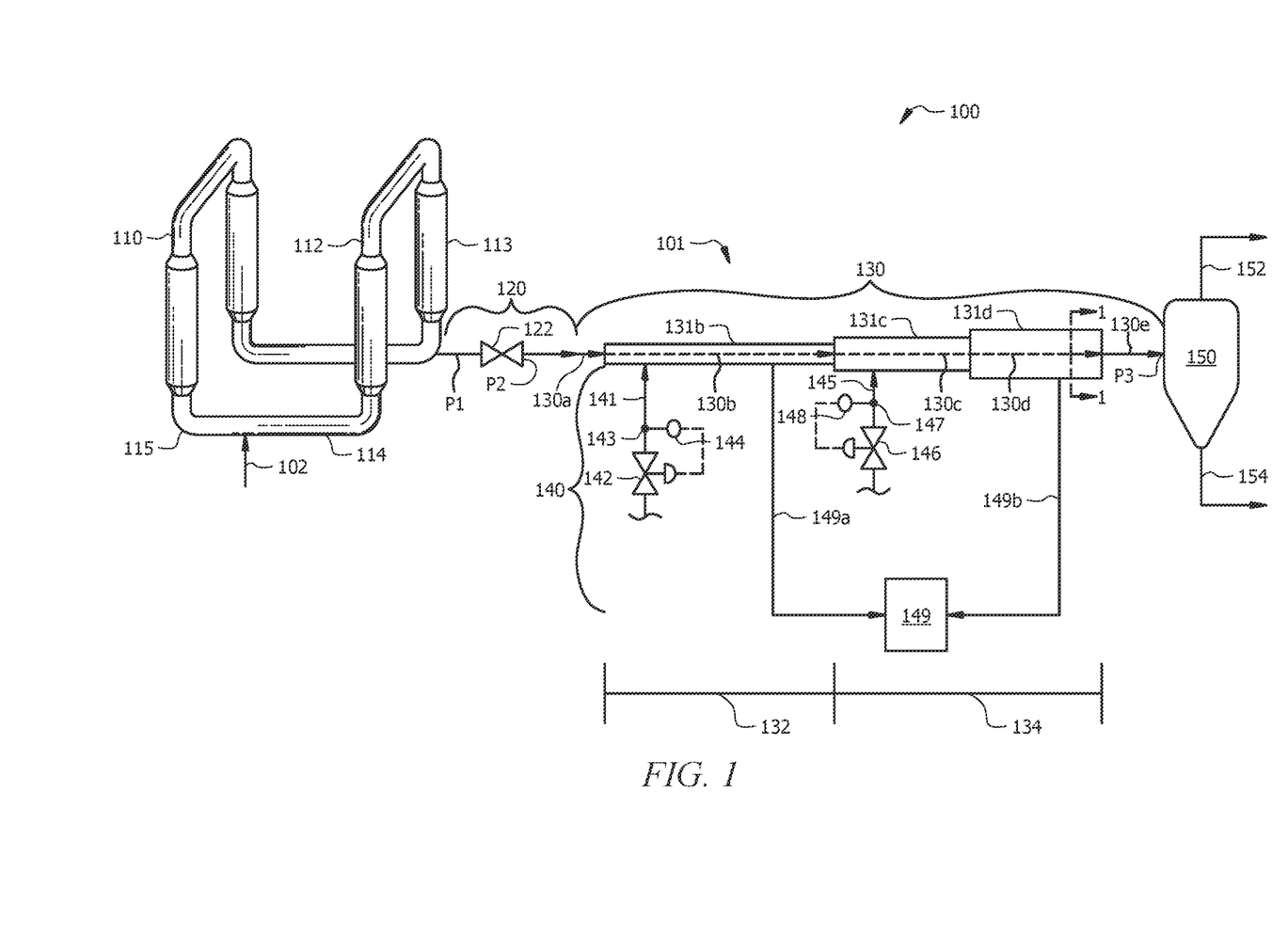
FIG. 1 illustrates a process flow diagram of a polymerization system containing the flashline separation system in accordance with aspects of the disclosure.

Turning now to the figures, FIG. 1 illustrates a process flow diagram of an embodiment of a polymerization system 100 according to the disclosure. The system 100 can include a polymerization reactor 110, a discharge conduit 120 configured to receive a polymerization product from the polymerization reactor 110 (e.g., as a slurry which is discharged from a loop slurry reactor), a flashline separation system 101 having a flashline heater 130 which receives the polymerization product (e.g., as a slurry or mixture) from the discharge conduit 120, and a separation vessel 150 which receives the polymerization product (e.g., as a mixture or a gas phase mixture) from the flashline heater 130 of the flashline separation system 101. Vapor can be recovered from the separation vessel 150 in conduit 152, and solid polyolefin can be recovered from the separation vessel 150 via conduit 154. The polymerization system 100 may additionally include any equipment associated with a polymerization system, such as pumps, measurement instruments (e.g., thermocouples, pressure sensors, particle size analyzers, and flow meters), temperature/pressure/flow/particle size control devices (e.g., a PID controller), alternative inlet and outlet lines, etc. The flashline separation system 101 also can include a steam control system 140 configured to control heat applied in the flashline heater 130, which is described in more detail below.

The polymerization reactor 110 generally includes one or more vessels configured to contact olefin monomer(s) and optionally olefin comonomer(s) with a solid catalyst to form a polyolefin. In some aspects, a diluent is used for gaseous monomer(s) (e.g., ethylene). In aspects, the polymerization reactor 110 can include a loop slurry reactor, a gas phase reactor, a high pressure reactor (e.g., autoclave or tubular reactor), or a combination thereof. In aspects where multiple reactors are embodied as the polymerization reactor 110, production of a polymerization product in multiple reactors may include several stages in at least two separate polymerization reactors interconnected by a transfer device (e.g., conduits and a separation vessel) making it possible to transfer the first polyolefin resulting from a first polymerization reactor into a second reactor. The desired polymerization conditions in one reactor may be different from the polymerization conditions of the other reactor(s). Alternatively, polymerization in multiple reactors may include the manual transfer of polymerization product (e.g., as a polymerization product slurry, as a mixture, as solid polymer, or combinations thereof) from one reactor to subsequent reactors for continued polymerization. Multiple reactor systems may include any combination including, but not limited to, multiple loop reactors, a combination of loop and gas reactors, multiple high pressure reactors or a combination of high pressure with loop and/or gas reactors. The multiple reactors may be operated in series, in parallel, or combinations thereof.

The polymerization reactor 110 is illustrated as a loop slurry reactor. In aspects, the loop slurry reactor may include vertical or horizontal pipes 112 and 114 interconnected by smooth bends or elbows 115, which together form a loop. Portions of the loop slurry reactor, such as pipes 112, may have cooling jackets 113 placed therearound to remove excess heat generated by the exothermic polymerization reactions. A cooling fluid may be circulated through cooling jackets 113, for example.

The operating temperature of the polymerization reactor 110 may be in a range of from about 140° F. (60° C.) to about 536° F. (280° C.), alternatively from about 158° F. (70° C.) to about 230° F. (110° C.). The operating pressure of the polymerization reactor 110 can be in a range of from about 100 psig (0.689 MPag) to about 1,000 psig (6.895 MPag). For loop slurry polymerization in a loop slurry reactor, pressure can be from about 400 psig (2.76 MPag) to about 1,000 psig (6.895 MPag), alternatively about 650 psig (4.48 MPag). Gas phase polymerization in a gas phase reactor can be in a range of from about 100 psig (0.689 MPag) to about 500 psig (3.45 MPag).

Monomers suitable for polymerization in the polymerization reactor 110 include alpha olefins, including but not limited to ethylene and propylene. Comonomers suitable for polymerization in the polymerization reactor 110 include any unsaturated olefin having 3 to 12 carbon atoms, including but not limited to 1-butene, 1-hexene, 1-octene, or combinations thereof. Suitable diluents are inert to the polymerization reactions and can include unsaturated hydrocarbons having 3 to 12 carbon atoms that are liquids under polymerization conditions. Examples of suitable diluents include, but are not limited to, propane, cyclohexane, isobutane, n-butane, n-pentane, isopentane, neopentane, n-hexane, or combinations thereof. In alternative aspects where the polymerization occurs under bulk polymerization conditions, the monomer in liquid phase can be used as the diluent (e.g., for polymerization of propylene, propylene is the monomer and the diluent). The polyolefin can be embodied as a homopolymer or copolymer, and the polyolefin recovered from the polymerization system 100 can be referred to as a resin.

In aspects, suitable catalysts include chromium-containing catalyst, Ziegler catalysts, Ziegler-Natta catalysts, metallocene catalysts, or combinations thereof. These catalysts may be part of a catalyst system additionally having a co-catalyst. Nonlimiting examples of a co-catalyst include triethylboron, methylaluminoxane, alkyls such as triethylaluminum, trimethylaluminum, or combinations thereof. The co-catalyst can be purchased and supplied in neat form or diluted in a solvent such as heptane, hexane, or other suitable saturated hydrocarbon. In aspects, the catalyst may be supported or unsupported. In aspects where the catalyst is on a support, the support may include silica, alumina, magnesium chloride, a solid acid, or a combination thereof.

The polymerization reaction components described above may be introduced to an interior of the polymerization reactor 110 via inlets or conduits at specified locations, such as feed conduit 102. In aspects where the polymerization reactor 110 is a loop slurry reactor, the reaction components can circulate through the loop formed by the loop slurry polymerization reactor. In aspects where the polymerization reactor 110 is a gas phase reactor, the reaction components can be passed through a fluidized bed of catalyst and polyolefin particles. Generally, continuous processes may comprise the continuous introduction of polymerization components into the polymerization reactor 110 and the continuous or discontinuous (e.g., intermittent) discharge or withdrawal (e.g., via discharge conduit 120) of a polymerization product. Continuous processes may comprise a residence time distribution in the polymerization reactor 110.

The polymerization product may be withdrawn from the polymerization reactor 110 via discharge conduit 120. The withdrawn polymerization product may be conveyed through the discharge conduit 120 to the flashline heater 130 and through the flashline heater 130 to the separation vessel 150 (e.g., conveyed via a drop in pressure). In flashline heater 130, a portion, substantially all, or all (e.g., 100 wt %) of liquid phase components present in the polymerization product (excluding the liquid entrained in the polyolefin solids) are converted to a vapor containing the gas phase of said components.

The discharge conduit 120 may comprise a valve 122. The valve 122 can be embodied as a continuous take-off (CTO) valve or a product take-off (PTO) valve (e.g., a cycling valve). The valve 122 may be configured to provide a pressure drop for the polymerization product passing therethrough. The pressure drop can provide the driving force for conveyance of the polymerization product through the discharge conduit 120 and/or flashline heater 130. For example, in aspects where the valve 122 is a CTO valve, the valve 122 can be configured to reduce the pressure of the polymerization product from a reactor pressure value P1 in the range of from 400 to 1,000 psig (2.76 to 6.90 MPag) to a pressure value P2 in the range of from 200 to 500 psig (1.37 to 3.45 MPag). In aspects where the valve 122 is a PTO valve, the valve 122 can be configured to reduce the pressure of the polymerization product from a reactor pressure value P1 in the range of from 400 to 1,000 psig (2.76 to 6.90 MPag) to a pressure value P2 in the range of from 20 to 80 psig (0.13 to 0.55 MPag). In some aspects, the discharge conduit 120 may have a nominal diameter in a range of from 1 inch to 8 inches Nominal Pipe Size (NPS) (25 mm to 200 mm Diametre Nominal (DN)), and the valve 122 may likewise have nominal diameter in a range of from 1 inch to 8 inches NPS (25 mm to 200 mm DN). In additional aspects, the nominal diameter of the discharge conduit 120 can be equal to the nominal diameter of the valve 122.

The flashline heater 130 of the flashline separation system 101 may have multiple segments connected end-to-end in series (e.g., segments 130a-130e as shown in FIG. 1). Generally, the first segment (e.g., segment 130a) is coupled to the polymerization reactor 110, and the last segment (e.g., segment 130e) is coupled to the separation vessel 150. At least one of the segments (e.g., segments 130b, 130c, and 130d) have a heating jacket (e.g., heating jackets 131b, 131c, and 131d), while other segments (e.g., segments 130a and 130e) in the flashline heater 130 are not jacketed. FIG. 1 shows that the first segment 130a and last segment 130e of the flashline heater 130 are not jacketed while the middle segments 130b-d have heating jackets 131b-d; however, it is contemplated that the flashline heater 130 can have all segments jacketed, have jackets alternating for every other segment, or any other configuration of jackets for segments connected in series, provided that the heating jackets are divided into at least two distinct groups for independent control of heat in each group of jackets by the steam control system 140. Steam can be supplied to the heating jackets (e.g., heating jackets 131b, 131c, and 131d) by the steam control system 140. Heat transfers from the stream in the heating jackets 131b-d, through the walls of the segments 130b-d, and into the polymerization product that is conveyed through the jacketed segments (e.g., segments 130b-d) of the flashline heater 130. Generally, the nominal diameter of each segment 130a-e can be in a range of from 1 inch to 8 inches Nominal Pipe Size (NPS) (25 mm to 200 mm Diametre Nominal (DN)). It is contemplated that the nominal diameter of the segments can increase in a downstream direction, e.g., the nominal diameter of segment 130a is less than the nominal diameter of segment 130e. In such aspects, the nominal diameter of the heating jackets 131b-d are appropriately sized such that the segments 130b-d fit in their respective heating jacket 131b-d while leaving an annular space for the presence of steam between the outer surface of the segments 130b-d and the inner surface of the heating jackets 131-d. Additional and alternative aspects of the flashline heater 130 and steam control system 140 are described in more detail below. In aspects, each segment and heating jacket can be embodied as a pipe or other type of conduit.

The flashline heater 130 may be configured to provide a pressure drop for the polymerization product passing therethrough. The pressure drop can provide the driving force for conveyance of the polymerization product through the flashline heater 130. For example, in aspects where the valve 122 is a CTO valve, the flashline heater 130 can be configured to receive the polymerization product from the valve 122 at an inlet pressure value P2 in the range of from 200 to 500 psig (1.37 to 3.45 MPag) and to provide the polymerization product to the separation vessel 150 at an outlet pressure value P3 in the range of from 50 to 400 psig (0.3 to 2.76 MPag). In aspects where the valve 122 is a PTO valve, the flashline heater 130 can be configured to receive the polymerization product from the valve 122 at an inlet pressure value P2 in the range of from 400 to 1,000 psig (2.76 to 6.90 MPag) and to provide the polymerization product to the separation vessel 150 at an outlet pressure value P3 of less than about 30 psig (0.21 MPag).

In aspects, the polymerization product conveyed through discharge conduit 120 and/or flashline heater 130 may be, depending on the location of the polymerization product, in the form of i) a slurry of liquid and solids, ii) a mixture of liquid, solids, and gases, or iii) a gas phase product mixture of solids and gases. That is, the phase composition of the polymerization product (e.g., slurry, mixture, gas phase product mixture) may be a function of the conditions (e.g., temperature and pressure) present at a given location in discharge conduit 120 and flashline heater 130. Vaporization of liquid in the discharge conduit 120 can be due to a pressure drop through the valve 122, and vaporization of liquid in the flashline heater 130 can be due to heat applied in the flashline heater 130 and due to the pressure drop through the flashline heater 130. In aspects, the polymerization product slurry may convert to a mixture of solid, liquid, and gas in the discharge conduit 120, the flashline heater 130, or both. In one aspect, the slurry of liquid and solids can convert to a mixture of solid, liquid, and gas in the discharge conduit 120, for example, at a location proximate to or within the valve 122 via a drop in pressure associated with the valve 122 of the discharge conduit 120, and the mixture may then convert to a gas phase product mixture as the polymerization product is conveyed through and heated in the flashline heater 130. Alternatively, the slurry of liquid and solids can convert to a mixture of solids, liquid, and gas and then to a gas phase product mixture as heat is applied in the flashline heater 130. In aspects, the polymerization product may include solid polyolefin, liquid phase diluent, and any unreacted monomer/comonomer. For example, the polymerization product may contain one or more of solid polyolefin, hydrogen, nitrogen, methane, ethylene, ethane, propylene, propane, butane, isobutane, pentane, hexane, 1-hexene, octane, 1-octene, and heavier hydrocarbons.

In aspects of this disclosure, the flashline heater 130 can have at least two steam stages, e.g., a first steam stage 132 followed by a second steam stage 134. In FIG. 1, segments 130a-e and heating jackets 131b-d of the flashline heater 130 can be grouped into the steam stages, e.g., segment 130b and heating jacket 131b can be part of the first steam stage 132, and segments 130c-d and heating jackets 131c-d can be part of the second steam stage 134. Segments 130a and 130e are not in a steam stage because they have no heating jackets placed thereon. In aspects, the segments in the first steam stage 132 can have a collective length of greater than about 50, 100, or 200 feet (greater than about 15.2, 30.4, 60.9 meters) and the segments in the second steam stage 134 can have a collective length of greater than about 50, 100, or 200 feet (greater than about 15.2, 30.4, 60.9 meters). In additional or alternative aspects, the collective length of the segments in the first steam stage 132 can be in a range of 25% to 75% of the total length of segments in the flashline heater 130, and the collective length of the segments in the second steam stage 134 can be in a range of 75% to 25% of the total length of the segments in the flashline heater 130.

The steam control system 140 of the flashline separation system 101 can be configured to heat the polymerization product in the flashline heater 130 using pressurized steam such as low pressure steam that is commonly available in polyolefin polymerization plants. In aspects, the steam control system 140 can be configured to heat the polymerization product by controlling a first pressure of steam in the first steam stage 132 of the flashline heater 130 to be equal to about a first value and by controlling a second pressure of steam in the second steam stage 134 of the flashline heater 130 to be equal to about a second value, where the first value is less than or greater than the second value (or the first value is not equal to the second value).

In aspects, the segments (e.g., segment 130b in FIG. 1) of the first steam stage 132 all have the same nominal diameter that is in the range of from 1 inch to 8 inches as measured by the Nominal Pipe Size (NPS) (25 mm to 200 mm as measured by the Diametre Nominal (DN)); alternatively, in a range of from 2.5 inches to 8 inches NPS (65 mm to mm 200 DN); alternatively, in a range of from 1 inch to 4 inches NPS (25 mm to 100 mm DN); alternatively, in a range of from 2.5 inches to 4 inches NPS (65 mm to 100 mm DN); or alternatively, 2.5 inches NPS (65 mm DN).

In additional aspects, each of the segments (e.g., segment 130c-d in FIG. 1) of the second steam stage 134 can independently have a nominal diameter in a range from 2 inches to 10 inches NPS (50 mm to 250 mm DN); alternatively, in range of from 2 inches to 8 inches NPS (50 mm to 200 mm DN); or alternatively, in range of from 2 inches to 6 inches NPS (50 mm to 150 mm DN). Generally, the nominal diameter of the segment(s) in the first steam stage 132 is less than or equal to the smallest nominal diameter of the segment(s) in the second steam stage 134. In some aspects, the nominal diameter of some segments (e.g., segment 130c) in the second steam stage 134 can be the same as the nominal diameter of other segments (e.g., 130d) in the second steam stage 134; alternatively, the nominal diameter of at least one segment (e.g., segment 130c) in the second steam stage 134 is different than the nominal diameter of at least one other segment (e.g., segment 130d) in the second steam stage 134. For example, the nominal diameter of segment 130c can be greater than or equal to 3 inches NPS (80 mm DN) and the nominal diameter of segment 130d can be greater than or equal to 4 inches NPS (100 mm DN).

In additional aspects, the nominal diameter of the first segment 130a of the flashline heater can be equal to or less than the nominal diameter of the first segment 130b of the first steam stage 132. Also, the nominal diameter of the last segment 130e of the flashline heater 130 can be equal to or greater than the nominal diameter of the last segment 130d of the second steam stage 134.

In some aspects, the nominal diameter of at least one segment 130b of the first steam stage 132 can be greater than or equal to 2.5 inches NPS (65 mm DN), the nominal diameter of the segment 130c of the second steam stage 134 can be greater than or equal to 3 inches NPS (80 mm DN), and the nominal diameter of the segment 130d of the second steam stage 134 can be greater than or equal to 4 inches NPS (100 mm DN).

In aspects, the segments and the heating jackets of the flashline heater 130 are both embodied as pipe, with a segment pipe being inside the heating jacket pipe such that both the segment pipe and the heating jacket pipe share the same longitudinal axis and an annular space is formed between the inner surface of the heating jacket pipe and the outer surface of the segment pipe. Exemplary sizes of heating jackets relative to segments are shown below:

| Segment<br>Nominal Diameter<br>NPS inches (DN mm) | Heating Jacket<br>Nominal Diameter<br>NPS inches (DN mm) |
|---|---|
| 1 (25) | 2 (50) |
| 1.5 (40) | 3 (80) |
| 2 (50) | 3 (80) |
| 2.5 (65) | 4 (100) |
| 3 (80) | 4 (100) |
| 3.5 (90) | 6 (150) |
| 4 (100) | 6 (150) |
| 5 (125) | 8 (200) |
| 6 (150) | 8 (200) |
| 8 (200) | 10 (250) |

As can be seen, a segment nominal diameter of 1 in (25 DN) can be paired with a heating jacket having nominal diameter of 2 inches (50 DN), and so on, as shown in the table above. The table above indicates that a heating jacket disclosed herein can have a nominal diameter in a range of from 2 inches to 10 inches (50 to 250 DN), depending on the size of the segment that is contained with the respective heating jacket.

The steam control system 140 of the flashline separation system 101 can include a first steam conduit 141 fluidly connected to the first heating jacket 131b, a first valve 142 positioned in the first steam conduit 141, a first sensor 143 placed in the first steam conduit 141 or in the first heating jacket 131b, and a first controller 144 coupled to the first valve 142 and to the first sensor 143. In aspects, the first sensor 143 can be embodied as a pressure transducer, pressure transmitter, or any other device having a sensor configured to measure the pressure in the first steam conduit 141 or the first heating jacket 131b. The first controller 144 can be configured to control the first pressure of steam in the first steam stage 132 of the flashline heater 130 to be equal to about the first value. The first value can be in a range of from about 0 psig to about 15 psig (about 0 MPag to about 0.103 MPag); alternatively, in a range of from about 0 psig to about 10 psig (about 0 MPag to about 0.0689 MPag); alternatively, in a range of from about 5 psig to about 15 psig (about 0.0345 MPag to about 0.103 MPag); alternatively, in a range of from about 10 psig to about 15 psig (about 0.0689 MPag to about 0.103 MPag).

As can be seen in FIG. 1, the first steam stage 132 has one heating jacket 131b. The annular space between the inner surface of the heating jacket 131b and the outer surface of segment 130b receives steam from the first steam conduit 141, and the steam pressure is controlled to be equal to about the first value by the first controller 144.

The steam control system 140 can further include a second steam conduit 145 fluidly connected to the second heating jacket (can be embodied as heating jacket 131c or heating jacket 131d), a second valve 146 positioned in the second steam conduit 145, a second sensor 147 placed in the second steam conduit 145 or in the second heating jacket (e.g., heating jacket 131c or heating jacket 131d), and a second controller 148 coupled to the second valve 146 and to the second sensor 147. In aspects, the second sensor 147 can be embodied as a pressure transducer, pressure transmitter, or any other device having a sensor configured to measure the pressure in the second steam conduit 145 or the second heating jacket (e.g., heating jacket 131b or 131c). The second controller 148 can be configured to control the second pressure of steam in the second steam stage 134 of the flashline heater 130 to be equal to about the second value. The second value can be in a range of from about 0 psig to about 15 psig (about 0 MPag to about 0.103 MPag); alternatively, in a range of from about 5 psig to about 15 psig (about 0.0345 MPag to about 0.103 MPag); alternatively, in a range of from about 10 psig to about 15 psig (about 0.0689 MPag to about 0.103 MPag); alternatively, in a range of from about 0 psig to about 10 psig (about 0 MPag to about 0.0689 MPag).

As can be seen in FIG. 1, the second steam stage 134 has two heating jackets 131c and 131d of two different nominal diameters. The nominal diameter of the heating jacket 131d can be greater than the nominal diameter of the heating jacket 131c. The annular space between the inner surface of the heating jacket 131c and the outer surface of segment 130c can be fluidly connected to the annular space between the inner surface of the heating jacket 131d and the outer surface of the segment 130d, such that the second controller 148 of the steam control system 140 can be configured to control the second pressure of steam to the second value in both heating jackets 131c and 131d. That is, the steam pressure inside the heating jackets 131c and 131d of the second steam stage 134 is the same, regardless of the size of the heating jacket and regardless of the size of the segment inside the heating jacket.

Generally, the annular space(s) in the second steam stage 134 are not fluidly connected with the annular space in the first steam stage 132, which allows for the steam control system 140 to independently control the steam pressure to the first value in the first steam stage 132 and to the second value in the second steam stage 134. Generally, the first value to which the first pressure is controlled by the first controller 144 is not equal to (less than or greater than) the second value to which the second pressure is controlled by the second controller 148. In some aspects, the first value is less than the second value, where: both the first value and the second value are in a range of from about 0 psig to about 15 psig (about 0 MPag to about 0.103 MPag); alternatively, the first value is in a range of from about 0 psig to about 10 psig (about 0 MPag to about 0.0689 MPag) and the second value is in a range of from about 5 psig to about 15 psig (about 0.0345 MPag to about 0.103 MPag). In other aspects, the first value is greater than the second value, where: both the first value and the second value are in a range of from about 0 psig to about 15 psig (about 0 MPag to about 0.103 MPag); alternatively, the second value is in a range of from about 0 psig to about 10 psig (about 0 MPag to about 0.0689 MPag) and the first value is in a range of from about 5 psig to about 15 psig (about 0.0345 MPag to about 0.103 MPag).

The steam control system 140 can further include one or more condensate tanks 149 coupled to the first heating jacket 131b and to the second heating jacket 131c. In FIG. 1, the condensate tank(s) 149 is connected to the first heating jacket 131b via conduit 149a and to the second heating jacket 131c via conduit 149b. The condensate tank(s) 149 is configured to receive condensate from the heating jackets 131c and 131d via the conduits 149a and 149b. It is contemplated that the flashline heater 130 can include additional steam stages, and the steam control system 140 can further include similar equipment for each additional steam stage, and the condensate tank(s) 149 can be fluidly connected to the heating jacket(s) of the additional steam stages via conduit(s) configured similarly to conduits 149a and 149b.

In aspects, the condensate tank(s) 149 include an independent condensate tank for each condensate conduit (e.g., conduits 149a and 149b in FIG. 1). Independent condensate collection via this configuration can provide for pressure equalization to achieve flow requirements for the flashline heater 130.

The steam control system 140 can be configured to heat the polymerization product such that a temperature of the polyolefin is less than the melting temperature, softening temperature, swelling temperature, or combinations thereof, of the polyolefin in the polymerization product. In aspects, the melting temperature of the solid polyolefin may comprise from about 180° F. (82.2° C.) to about 266° F. (130° C.); alternatively, from about 221° F. (105° C.) to about 266° F. (130° C.); alternatively, from about 180° F. (82.2° C.) to about 240° F. (115.6° C.); alternatively, from about 221° F. (105° C.) to about 240° F. (115.6° C.); alternatively, from about 248° F. (120.5° C.) to about 266° F. (130° C.). In additional aspects, the solid polyolefin can be polyethylene and the heat supplied by the steam control system 140 can result in a polyethylene temperature of greater than or equal to about 0° F. (−17.7° C.) and less than or equal to about 130° F. (54.5° C.); alternatively, greater than or equal to about 0° F. (−17.7° C.) and less than or equal to about 180° F. (82.2° C.). In other additional aspects, the solid polymer can be polypropylene and the heat supplied by the steam control system 140 can result in a polypropylene temperature of greater than or equal to about 0° F. (−17.7° C.) and less than or equal to about 250° F. (121.2° C.); alternatively, greater than or equal to about 0° F. (−17.7° C.) and less than or equal to about 170° F. (76.7° C.); alternatively, greater than or equal to about 0° F. (−17.7° C.) and less than or equal to about 120° F. (48.9° C.).

In some aspects, the temperature difference between the vapor and solid polyolefin in the final segment 130d of the flashline heater 130 may be substantially negligible or the temperature of the solid polyolefin may approach about within 50° F. (27.8° C.), 40° F. (22.2° C.), 20° F. (11.1° C.), 10° F. (5.6° C.), 5° F. (2.8° C.), or 1° F. (0.6° C.) of the temperature of the vapor. Further, the mixed phase product in segment 130d may approach a thermal equilibrium, such that substantially all of the liquid present (e.g., liquid entrained in the solid polyolefin), the vapor, and the solid polyolefin each have a temperature that differ from one another by no more than 1° F. (0.6° C.).

In aspects, the polymerization product in the final segment (e.g., segment 130e) of the flashline heater 130 can be embodied as a mixture of liquid, solids, and gases, where the liquid that is present in the mixture is less than 5, 4, 3, 2, or 1 wt % based on a total weight of the mixture, and where the amount of liquid for purposes of this calculation does not include any liquid entrained within the solid polyolefin that is present in the mixture. In additional or alternative aspects, the polymerization product in the final segment (e.g., segment 130e) of the flashline heater 130 can be embodied as a mixture of liquid, solids, and gases or as a gas phase product mixture of solids and gases, and the only liquid present in the polymerization product is entrained in the polyolefin solids. In additional or alternative aspect, the polymerization product in the final segment (e.g., segment 130e) of the flashline heater 130 can be embodied as a gas phase product mixture, and there is no liquid entrained in the polyolefin solids.

In aspects, the separation vessel 150 can be embodied as a flash tank, a degassing vessel (also referred to as a purge column), a cyclone, or a combination thereof. In embodiments where the separation vessel 150 is a single vessel such as a flash tank, a degassing vessel, or cyclone, vapor can be recovered from the separation vessel 150 in conduit 152 and solid polyolefin can be recovered from the separation vessel 150 via conduit 154. In embodiments where the separation vessel 150 includes a first vessel followed by a second vessel, vapor can be recovered from the first vessel in conduit 152 and solid polyolefin can be recovered from the second vessel via conduit 154. In such embodiments, the first vessel can include a flash tank or cyclone and the second vessel can include a degassing vessel (or purge column). Solid polyolefin recovered from the first vessel can flow from the first vessel to the second vessel via a transfer conduit. The transfer conduit can be configured with heating (e.g., a configuration similar to any embodiment of the flashline heater disclosed herein; alternatively, electric heaters) so as to heat the hydrocarbons that accompany solid polyolefin in the transfer line to improve removal of the hydrocarbons as vapor in the second vessel. It is contemplated that heating in the transfer line in combination with the heating by the inventive steam stage heating for the flashline heater 130 improves separations of hydrocarbons from the solid polyolefins in the separation vessel 150. In aspects, the first vessel can operate at pressure in the range of 0 psig to 50 psig (0 MPag to 0.345 MPag); alternatively, at a pressure in a range of 100 psig to 400 psig (0.689 MPag to 2.758 MPag).

Figure 2:
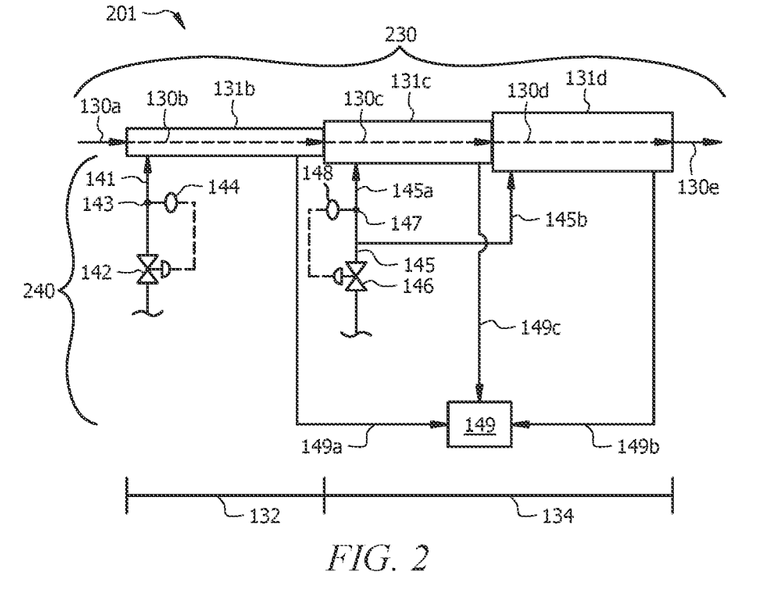
FIG. 2 illustrates an isolated process flow diagram of another embodiment of the flashline separation system.

FIG. 2 illustrates an isolated process flow diagram of another embodiment of a flashline separation system 201. In FIG. 2, like reference numerals represent like parts as described for FIG. 1. For example, segment 130b and heating jacket 131b are contained in the first steam stage 132, and segments 130c-d and heating jackets 131c-d are contained in the second steam stage 134. The flashline separation system 201 differs from the flashline separation system 101 in FIG. 1, in that, the annular space between the inner surface of the heating jacket 131c and the outer surface of segment 130c of flashline separation system 201 is not fluidly connected to the annular space between the inner surface of the heating jacket 131d and the outer surface of the segment 130d of the flashline separation system 201. The polymerization product can flow through the flashline heater 130 in the series of segments formed by 130a-e.

Steam conduit 141 still can feed steam to the heating jacket 131b, and the first controller 144 of the steam control system 240 can be configured to control the second pressure of steam to the second value in both heating jackets 131c and 131d via conduit. FIG. 2 illustrates that the second steam conduit 145 can split into a first portion 145a and a second portion 145b. The first portion 145a can connect to the heating jacket 131c, and the second portion 145b can connect to the heating jacket 131d. The second controller 148 of the steam control system 240 can be configured to control the second pressure of steam to the second value in both heating jackets 131c and 131d via conduit portions 145a and 145b. An annular space is created between an inner surface of each heating jacket 131b-d and the outer surface of the respective segment 130b-d, and the annular space for each heating jacket/segment pair is fluidly isolated from the other annular spaces such that steam from one annular space does not flow or travel into another annular space. Thus, the flashline separation system 201 in FIG. 2 contains a condensate conduit 149a-c for each heating jacket 131b-d. Conduit 149a connects the heating jacket 131b to the one or more condensate tanks 149, conduit 149b connects the heating jacket 131d to the one or more condensate tanks 149, and conduit 149c connects the heating jacket 131c to the one or more condensate tanks 149.

Figure 3:
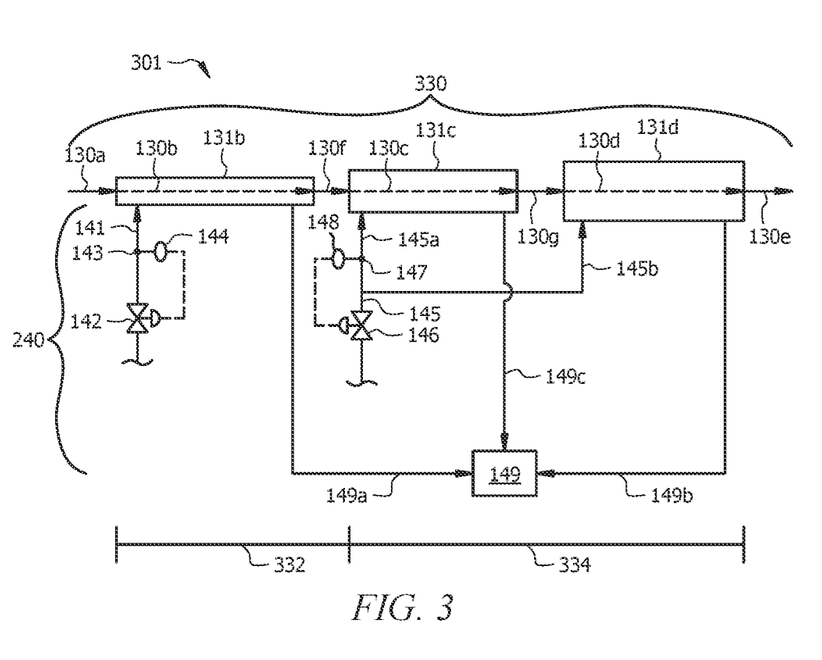
FIG. 3 illustrates an isolated process flow diagram of another embodiment of the flashline separation system.

FIG. 3 illustrated an isolated process flow diagram of another embodiment of a flashline separation system 301. In FIG. 3, like reference numerals represent like parts as described for FIGS. 1 and 2. The flashline separation system 301 of FIG. 3 differs from the flashline separation systems 101 and 201 in FIGS. 1 and 2, in that, the flashline heater 130 contains unjacketed segments 130f and 130g in addition to jacketed segments 130b-d and unjacketed segments 130a and 130e. As can be seen, unjacketed segment 130f is connected to jacketed segment 130b and jacketed segment 130c, and unjacketed segment 130g is connected to jacketed segment 130c and jacketed segment 130d. Segments 130b, unjacketed segment 130f, and heating jacket 131b are contained in the first steam stage 332; and segments 130c-e, unjacketed segment 130g, and heating jackets 131 c-d are contained in the second steam stage 334. The polymerization product can flow through the flashline heater 130 in the series of segments formed by 130a, 130b, 130f, 130c, 130g, 130d, and 130e. The flashline separation system 301 of FIG. 3 contains the same steam control system 240 as described for FIG. 2.

Due to the presence of unjacketed segment 130f between heating jacket 131b-c and unjacketed segment 130g between heating jacket 131c-d, the annular space for each heating jacket/segment pair is fluidly isolated from the other annular spaces such that steam from one annular space does not flow or travel into another annular space. Thus, the flashline separation system 301 in FIG. 3 contains a condensate conduit 149a-c for each heating jacket 131b-d. Conduit 149a connects the heating jacket 131b to the one or more condensate tanks 149, conduit 149b connects the heating jacket 131d to the one or more condensate tanks 149, and conduit 149c connects the heating jacket 131c to the one or more condensate tanks 149.

Figure 4:
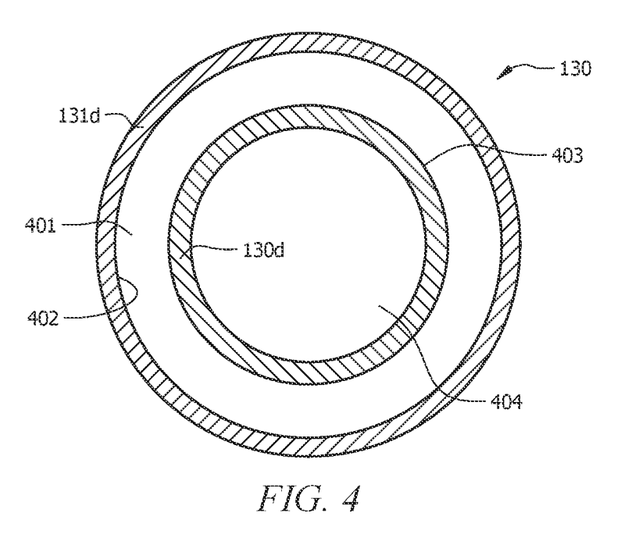
FIG. 4 illustrates a cross-sectional view of the flashline heater taken along sight line 1-1 in FIG. 1.

FIG. 4 illustrates a cross-sectional view of the flashline heater taken along sight line 1-1 in FIG. 1. The segment 130d of the flashline heater 130 can be seen as contained within the heating jacket 131d. The annular space 401 in which steam is received is between the inner surface 402 of the heating jacket 131d and the outer surface 403 of the segment 130d. Polymerization product flows in the interior 404 of the segment 130d. It is contemplated that segment 130d and heating jacket 131d illustrated in FIG. 4 are illustrative of the other segments and heating jackets disclosed herein, and other pairs of segments and heating jackets would likewise have an annular space between an inner surface of the heating jacket and an outer surface of the segment.

Disclosed herein is also a process that can be utilized in the polymerization system 100 and in any embodiment of the flashline separation systems 101, 201, and 301. The process can include controlling a first pressure of steam in the first steam stage 132/332 of the flashline heater 130 to be equal to about a first value and controlling a second pressure of steam in the second steam stage 134/334 of the flashline heater 130 to be equal to about a second value, wherein the first value is not equal to (e.g., is less than or greater than) the second value. The process can further include polymerizing an olefin in a polymerization reactor 110, withdrawing a polymerization product from the polymerization reactor 110 (e.g., via discharge conduit 120) and flowing the polymerization product through the flashline heater 130 to a separation vessel 150. In aspects of the process, the olefin can be ethylene or propylene and the polyolefin can be a polyethylene or a polypropylene of the type described herein.

In aspects, controlling the first pressure of steam in the first steam stage 132/332 of the flashline heater 130 to be equal to about the first value can include measuring the first pressure of steam in the first steam stage 132/332, and actuating a first valve 142 to increase or decrease a flow rate of steam to a first heating jacket 131b of the first steam stage 132/332 of the flashline heater 130. Controlling the second pressure of steam in the second steam stage 134/334 of the flashline heater 130 to be equal to about the second value can include measuring the second pressure of steam in the second steam stage 134/334, and actuating a second valve 146 to increase or decrease a flow rate of steam to a second heating jacket (e.g., heating jacket 131c and/or heating jacket 131d) of the second steam stage 134/334 of the flashline heater 130.

In aspects, measuring the first pressure of steam can be performed by the first sensor 143 located in the first steam conduit 141 of the steam control system 140/240 or in the first heating jacket 131b, and measuring the second pressure of steam can be performed by the second sensor 147 located in the second steam conduit 145 of the steam control system 140/240 or in the second heating jacket (e.g., heating jacket 131c and/or heating jacket 131d).

In aspects, the process can also include collecting condensate from the first steam stage 132/332 of the flashline heater 130 (e.g., via conduit 149a of the steam control system 140/240), and collecting condensate from the second steam stage 134/334 of the flashline heater 130 (e.g., via conduit 149b of steam control system 140/240 and optionally via conduit 149c of steam control system 240).

Also disclosed herein is a process for retrofitting a flashline separation system of an olefin polymerization system from single stage heating to an embodiment of the multiple-stage heating disclosed herein. Retrofitting can include changing a number of steam stages in the flashline separation system to include multiple steam stages, for example, to include a first steam stage 132/332 and a second steam stage 134/334, where the first steam stage 132/332 is followed by the second steam stage 134/334. Retrofitting also contemplates changing the number of steam stages to more than two steam stages 132/332 and 134/334. Retrofitting can also include changing the steam control system configured to control a single steam stage to a steam control system 140/240 disclosed herein, for example, that has i) a first controller 144 configured to control a first pressure of steam in the first steam stage 132/332 to be equal to about a first value disclosed herein and ii) a second controller 148 configured to control a second pressure of steam in the second steam stage 134/334 to be equal to about a second value disclosed herein, where the first value is not equal to the second value.

ADDITIONAL DISCLOSURE

The following is provided as additional disclosure for combinations of features and aspects of the present invention.

Aspect 1 is a method comprising a process for operating a flashline heater in an olefin polymerization system, wherein the flashline heater comprises a first steam stage and a second steam stage, the process comprising controlling a first pressure of steam in the first steam stage of the flashline heater to be equal to about a first value, and controlling a second pressure of steam in the second steam stage of the flashline heater to be equal to about a second value, wherein the first value is not equal to the second value.

Aspect 2 is the process of Aspect 1, wherein controlling the first pressure of steam in the first steam stage of the flashline heater to be equal to about the first value comprises measuring the first pressure of steam in the first steam stage, and actuating a first valve to increase or decrease a flow rate of steam to a first heating jacket of the first steam stage of the flashline heater, and wherein controlling the second pressure of steam in the second steam stage of the flashline heater to be equal to about the second value comprises measuring the second pressure of steam in the second steam stage, and actuating a second valve to increase or decrease a flow rate of steam to a second heating jacket of the second steam stage of the flashline heater.

Aspect 3 is the process of any of Aspects 1 and 2, wherein the first value is in a range of from 0 psig to about 15 psig, and wherein the second value is in a range of from 0 psig to about 15 psig.

Aspect 4 is the process of any of Aspects 2 to 3, wherein the first valve is in a first steam conduit of the first steam stage and the second valve is in a second steam conduit of the second steam stage.

Aspect 5 is the process of Aspect 4, wherein measuring the first pressure of steam is performed by a first sensor located in the first steam conduit or in the first heating jacket, and wherein measuring the second pressure of steam is performed by a second sensor located in the second steam conduit or the second heating jacket.

Aspect 6 is the process of Aspect 2, wherein the flashline heater comprises a plurality of segments, wherein at least one segment of the plurality of segments is in the first steam stage, and wherein at least one segment of the plurality of segments is in the second steam stage.

Aspect 7 is the process of Aspect 6, wherein the first heating jacket is positioned around at least a portion of the at least one segment of the plurality of segments that is in the first steam stage, wherein the second heating jacket is positioned around at least a portion of the at least one segment of the plurality of segments that is in the second steam stage.

Aspect 8 is the process of any of Aspects 6 and 7, wherein the at least one segment of the first steam stage has a nominal diameter in a range of from 1 inch to 8 inches, wherein the at least one segment of the second steam stage comprises a first segment and a second segment, wherein the first segment has a nominal diameter in a range of from 2 inches to 10 inches, wherein the second segment has a nominal diameter in a range of from 2 inches to 10 inches, wherein the nominal diameter of the second segment is greater than the nominal diameter of the first segment.

Aspect 9 is the process of Aspect 8, wherein the nominal diameter of the at least one segment of the first steam stage is greater than or equal to 2.5 inches, wherein the nominal diameter of the first segment of the second steam stage is greater than or equal to 3 inches, wherein the nominal diameter of the second segment of the second steam stage is greater than or equal to 4 inches.

Aspect 10 is the process of any of Aspects 1 to 9, further comprising collecting condensate from the first steam stage of the flashline heater, and collecting condensate from the second steam stage of the flashline heater.

Aspect 11 is a flashline separation system comprising a flashline heater having a first steam stage followed by a second steam stage, a steam control system comprising a first controller configured to control a first pressure of steam in the first steam stage of the flashline heater to be equal to about a first value, and a second controller configured to control a second pressure of steam in the second steam stage of the flashline heater to be equal to about a second value, wherein the first value is not equal to the second value.

Aspect 12 is the flashline separation system of Aspect 11, wherein the flashline heater comprises a plurality of segments, wherein at least one segment of the plurality of segments is in the first steam stage, and wherein at least one segment of the plurality of segments is in the second steam stage.

Aspect 13 is the flashline separation system of Aspect 12, wherein the first steam stage of the flashline heater has a first heating jacket around at least a portion of the at least one segment of the plurality of segments that is in the first steam stage, and wherein the second steam stage of the flashline heater has a second heating jacket around at least a portion of the at least one segment of the plurality of segments that is in the second steam stage.

Aspect 14 is the flashline separation system of Aspect 13, further comprising a first steam conduit connected to the first heating jacket, and a second steam conduit connected to the second heating jacket.

Aspect 15 is the flashline separation system of Aspect 14, wherein the steam control system further comprises a first valve positioned in the first steam conduit, a second valve positioned in the second steam conduit, a first sensor positioned in the first steam conduit or in the first heating jacket, and a second sensor positioned in the second steam conduit or in the second heating jacket, wherein the first controller is coupled to the first valve and to the first sensor, and wherein the second controller is coupled to the second valve and to the second sensor.

Aspect 16 is the flashline separation system of Aspect 13, further comprising one or more condensate tanks connected to the first heating jacket and the second heating jacket, wherein the one or more condensate tanks are configured to receive condensate from the first heating jacket and the second heating jacket.

Aspect 17 is the flashline separation system of Aspect 12, wherein the at least one segment of the first steam stage has a nominal diameter in a range of from 1 inch to 8 inches, wherein the at least one segment of the second steam stage comprises a first segment and a second segment, wherein the first segment has a nominal diameter in a range of from 2 inches to 10 inches, wherein the second segment has a nominal diameter in a range of from 2 inches to 10 inches, wherein the nominal diameter of the second segment is greater than the nominal diameter of the first segment.

Aspect 18 is the flashline separation system of Aspect 17, wherein the nominal diameter of the at least one segment of the first steam stage is 2.5 inches, wherein the nominal diameter of the first segment of the second steam stage is 3 inches, and wherein the nominal diameter of the second segment of the second steam stage is 4 inches.

Aspect 19 is the flashline separation system of any of Aspects 11 to 18, wherein the first value is in a range of from 0 psig to about 15 psig, and wherein the second value is in a range of from 0 psig to about 15 psig.

Aspect 20 is a process for retrofitting a steam control system in a flashline separation system of an olefin polymerization system, the process comprising changing a number of steam stages in the flashline separation system to include a first steam stage and a second steam stage, wherein the first steam stage is followed by the second steam stage, and changing the steam control system to have i) a first controller configured to control a first pressure of steam in the first steam stage to be equal to about a first value and ii) a second controller configured to control a second pressure of steam in the second steam stage to be equal to about a second value, wherein the first value is not equal to the second value.

While aspects and embodiments of the disclosure have been shown and described, modifications thereof can be made without departing from the spirit and teachings of the invention. The embodiments and examples described herein are exemplary only, and are not intended to be limiting.

Many variations and modifications of the invention disclosed herein are possible and are within the scope of the invention.

At least one embodiment is disclosed and variations, combinations, and/or modifications of the embodiment(s), and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, 5, 6, . . . ; greater than 0.10 includes 0.11, 0.12, 0.13, 0.14, 0.15, . . . ). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent . . . 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of.

Accordingly, the scope of protection is not limited by the description set out above but is only limited by the claims which follow, that scope including all equivalents of the subject matter of the claims. Each and every claim is incorporated into the specification as an aspect of the present invention. Thus, the claims are a further description and are an addition to the detailed description of the present invention.

What is claimed is:

1. A process for operating a flashline heater in an olefin polymerization system, wherein the olefin polymerization system comprises a reactor, a discharge conduit extending between the reactor and the flashline heater, wherein the discharge conduit comprises a continuous take-off (CTO) valve, and wherein the flashline heater comprises a first steam stage and a second steam stage, the process comprising:

controlling a first pressure of steam in the first steam stage of the flashline heater to be equal to about a first value; and controlling a second pressure of steam in the second steam stage of the flashline heater to be equal to about a second value, wherein the first value is not equal to the second value;

wherein controlling the first pressure of steam in the first steam stage of the flashline heater to be equal to about the first value comprises:

measuring the first pressure of steam in the first steam stage; and actuating a first valve to increase or decrease a flow rate of steam to a first heating jacket of the first steam stage of the flashline heater; and wherein controlling the second pressure of steam in the second steam stage of the flashline heater to be equal to about the second value comprises:

measuring the second pressure of steam in the second steam stage; and actuating a second valve to increase or decrease a flow rate of steam to a second heating jacket of the second steam stage of the flashline heater;

wherein the flashline heater comprises a plurality of segments, wherein at least one segment of the plurality of segments is in the first steam stage, and wherein at least one segment of the plurality of segments is in the second steam stage;

wherein the at least one segment of the first steam stage has a nominal diameter in a range of from 1 inch to 8 inches, wherein the at least one segment of the second steam stage comprises a first segment and a second segment, wherein the first segment has a nominal diameter in a range of from 2 inches to 10 inches, wherein the second segment has a nominal diameter in a range of from 2 inches to 10 inches, wherein the nominal diameter of the second segment is greater than the nominal diameter of the first segment; and wherein the collective length of the segments in the first steam stage is in a range of 25% to 75% of the total length of segments in the flashline heater and the collective length of the segments in the second steam stage is in a range of 75% to 25% of the total length of the segments in the flashline heater.

2. The process of claim 1, wherein the first value is in a range of from 0 psig to about 15 psig, and wherein the second value is in a range of from 0 psig to about 15 psig.

3. The process of claim 2, wherein the nominal diameter of the at least one segment of the first steam stage is greater than or equal to 2.5 inches, wherein the nominal diameter of the first segment of the second steam stage is greater than or equal to 3 inches, wherein the nominal diameter of the second segment of the second steam stage is greater than or equal to 4 inches.

4. The process of claim 1, wherein the first valve is in a first steam conduit of the first steam stage and the second valve is in a second steam conduit of the second steam stage.

5. The process of claim 4, wherein measuring the first pressure of steam is performed by a first sensor located in the first steam conduit or in the first heating jacket, and wherein measuring the second pressure of steam is performed by a second sensor located in the second steam conduit or the second heating jacket.

6. The process of claim 5, wherein the nominal diameter of the at least one segment of the first steam stage is greater than or equal to 2.5 inches, wherein the nominal diameter of the first segment of the second steam stage is greater than or equal to 3 inches, wherein the nominal diameter of the second segment of the second steam stage is greater than or equal to 4 inches.

7. The process of claim 1, wherein the first heating jacket is positioned around at least a portion of the at least one segment of the plurality of segments that is in the first steam stage, wherein the second heating jacket is positioned around at least a portion of the at least one segment of the plurality of segments that is in the second steam stage.

8. The process of claim 7, wherein the nominal diameter of the at least one segment of the first steam stage is greater than or equal to 2.5 inches, wherein the nominal diameter of the first segment of the second steam stage is greater than or equal to 3 inches, wherein the nominal diameter of the second segment of the second steam stage is greater than or equal to 4 inches.

9. The process of claim 1, wherein the nominal diameter of the at least one segment of the first steam stage is greater than or equal to 2.5 inches, wherein the nominal diameter of the first segment of the second steam stage is greater than or equal to 3 inches, wherein the nominal diameter of the second segment of the second steam stage is greater than or equal to 4 inches.

10. The process of claim 1, further comprising:
collecting condensate from the first steam stage of the flashline heater; and
collecting condensate from the second steam stage of the flashline heater.

11. The process of claim 1, wherein the CTO valve is configured to reduce pressure from a reactor pressure value in a range of from 400 to 1,000 psig to a pressure value in the range of from 200 to 500 psig.

12. The process of claim 11, wherein the nominal diameter of the at least one segment of the first steam stage is 2.5 inches, wherein the nominal diameter of the first segment of the second steam stage is 3 inches, and wherein the nominal diameter of the second segment of the second steam stage is 4 inches.

13. A flashline separation system comprising:
a reactor,
a flashline heater having a first steam stage followed by a second steam stage;
a discharge conduit extending between the reactor and the flashline heater, wherein the discharge conduit comprises a continuous take-off (CTO) valve; and
a steam control system comprising:
a first controller configured to control a first pressure of steam in the first steam stage of the flashline heater to be equal to about a first value; and
a second controller configured to control a second pressure of steam in the second steam stage of the flashline heater to be equal to about a second value,
wherein the first value is not equal to the second value,
wherein the flashline heater comprises a plurality of segments, wherein at least one segment of the plurality of segments is in the first steam stage, and wherein at least one segment of the plurality of segments is in the second steam stage,
wherein the first steam stage of the flashline heater has a first heating jacket around at least a portion of the at least one segment of the plurality of segments that is in the first steam stage, and wherein the second steam stage of the flashline heater has a second heating jacket around at least a portion of the at least one segment of the plurality of segments that is in the second steam stage,
wherein the at least one segment of the first steam stage has a nominal diameter in a range of from 1 inch to 8 inches, wherein the at least one segment of the second steam stage comprises a first segment and a second segment, wherein the first segment has a nominal diameter in a range of from 2 inches to 10 inches, wherein the second segment has a nominal diameter in a range of from 2 inches to 10 inches, wherein the nominal diameter of the second segment is greater than the nominal diameter of the first segment, and
wherein the collective length of the segments in the first steam stage is in a range of 25% to 75% of the total length of segments in the flashline heater and the collective length of the segments in the second steam stage is in a range of 75% to 25% of the total length of the segments in the flashline heater.

14. The flashline separation system of claim 13, further comprising:
a first steam conduit connected to the first heating jacket; and
a second steam conduit connected to the second heating jacket.

15. The flashline separation system of claim 14, wherein the steam control system further comprises:
a first valve positioned in the first steam conduit;
a second valve positioned in the second steam conduit;
a first sensor positioned in the first steam conduit or in the first heating jacket; and
a second sensor positioned in the second steam conduit or in the second heating jacket,
wherein the first controller is coupled to the first valve and to the first sensor, and
wherein the second controller is coupled to the second valve and to the second sensor.

16. The flashline separation system of claim 15, wherein the nominal diameter of the at least one segment of the first steam stage is 2.5 inches, wherein the nominal diameter of the first segment of the second steam stage is 3 inches, and wherein the nominal diameter of the second segment of the second steam stage is 4 inches.

17. The flashline separation system of claim 15, wherein the nominal diameter of the at least one segment of the first steam stage is 2.5 inches, wherein the nominal diameter of the first segment of the second steam stage is 3 inches, and wherein the nominal diameter of the second segment of the second steam stage is 4 inches.

18. The flashline separation system of claim 13, further comprising:
one or more condensate tanks connected to the first heating jacket and the second heating jacket, wherein the one or more condensate tanks are configured to receive condensate from the first heating jacket and the second heating jacket.

19. The flashline separation system of claim 18, wherein the nominal diameter of the at least one segment of the first steam stage is 2.5 inches, wherein the nominal diameter of the first segment of the second steam stage is 3 inches, and wherein the nominal diameter of the second segment of the second steam stage is 4 inches.

20. The flashline separation system of claim 13, wherein the nominal diameter of the at least one segment of the first steam stage is 2.5 inches, wherein the nominal diameter of the first segment of the second steam stage is 3 inches, and wherein the nominal diameter of the second segment of the second steam stage is 4 inches.

21. The flashline separation system of claim 13, wherein the first value is in a range of from 0 psig to about 15 psig, and wherein the second value is in a range of from 0 psig to about 15 psig.

22. The flashline separation system of claim 21, wherein the nominal diameter of the at least one segment of the first steam stage is 2.5 inches, wherein the nominal diameter of the first segment of the second steam stage is 3 inches, and wherein the nominal diameter of the second segment of the second steam stage is 4 inches.

23. The flashline separation system of claim 13, wherein the CTO valve is configured to reduce pressure from a reactor pressure value in a range of from 400 to 1,000 psig to a pressure value in the range of from 200 to 500 psig.

\* \* \* \* \*